United States Patent [19]
Baker

[11] Patent Number: 5,042,766
[45] Date of Patent: Aug. 27, 1991

[54] WALL HANGING SUPPORT ASSEMBLY THAT IS VERTICALLY ADJUSTABLE

[76] Inventor: Patricia Baker, 2403 Old Falls Blvd., Niagara Falls, N.Y. 14304

[21] Appl. No.: 485,503

[22] Filed: Feb. 28, 1990

[51] Int. Cl.$^5$ .............................................. A47G 29/00
[52] U.S. Cl. ................................ 248/200.1; 248/220.1
[58] Field of Search ................ 248/220.1, 200.1, 201, 248/251, 257

[56] References Cited
U.S. PATENT DOCUMENTS 2,450,091  9/1949  Kendall .
2,689,103  9/1954  Ackerman ........................... 248/257
3,430,908  3/1969  Kowalczyk ...................... 248/258 X
3,521,758  7/1970  Guilfoyle ...................... 248/200.1 X
4,712,761  12/1987  Wassell .
4,727,815  3/1988  Miller .

Primary Examiner—Alvin C. Chin-Shue
Assistant Examiner—Robert A. Olson
Attorney, Agent, or Firm—Terry M. Gernstein

[57] ABSTRACT

A wall hanging support assembly is adjustable in both the horizontal and in the vertical directions after wall brackets are affixed to the walls. The assembly is used in a corner.

4 Claims, 5 Drawing Sheets

WALL HANGING SUPPORT ASSEMBLY THAT IS VERTICALLY ADJUSTABLE

TECHNICAL FIELD OF THE INVENTION

The present invention relates to the general art of supports, and to the particular field of wall mounted supports.

BACKGROUND OF THE INVENTION

Many interior designers include a variety of wall hangings in the design of a room. These wall hangings range from simple pictures to heavy objects such as draperies, carpets and the like. In fact, modern electronic technology has created televisions and television-like elements that are so flat as to be amenable to being supported on a wall of a room. In particular, many restaurants include televisions located on a wall for the entertainment of their customers.

Heretofore, many of these wall hangings, in particular the heavy items, have been restricted to location only on a planar surface. These items simply do not fit properly in a corner of a room. Thus, many room designs have been somewhat limited due to the requirement that some of the items be located only on a planar portion of a wall surface.

While there are many forms of wall hanging supports, such as the well known picture hangers, most of these elements will not adequately support a heavy item in the corner of a room.

One drawback to the presently known wall hanging supports, such as the picture hangers, is that once placed on the wall, it is often difficult to vary the height of the wall hanging without removing the support from the wall. Removal of many of these supports leaves marks, such as holes, or the like, on the wall.

Still further, it is often a difficult task to locate the support in exactly the proper position on the wall. Often, levels, tape measures and the like are required to exactly position the support.

Therefore, there is a need for a wall hanging support that can be used in the corner of a room to support heavy items and to vary the position of such items on the wall as necessary without leaving marks on the wall and which can be set onto the wall in an expeditious manner.

OBJECTS OF THE INVENTION

It is a main object of the present invention is to provide a wall hanging support that can be used in the corner of a room.

It is another object of the present invention to a wall hanging support that can be used in the corner of a room to support heavy items and to vary the position of such items on the wall as necessary.

It is another object of the present invention to a wall hanging support that can be used in the corner of a room to support heavy items and to vary the position of such items on the wall as necessary without leaving marks on the wall.

It is another object of the present invention to a wall hanging support that can be used in the corner of a room to support heavy items and to vary the position of such items on the wall as necessary without leaving marks on the wall and which can be set onto the wall in an expeditious manner.

SUMMARY OF THE INVENTION

These, and other, objects are achieved by a wall hanging support assembly that is supported on two intersecting walls by hinged brackets and which includes a central support assembly that can be moved horizontally as well as vertically to accommodate different heights and spacings between the brackets. A hook element is slidably attached to the central support assembly so the wall hanging can be moved into a desired position.

In this manner, the brackets can be mounted on intersecting walls at a corner, and the central assembly can be moved in at least two planes, vertical and horizontal, to position that assembly in the most suitable location. The brackets need not be removed from the wall in the event the wall hanging is to be re-positioned because various extension elements can be used to relocate and re-position the central assembly.

BRIEF DESCRIPTION OF THE DRAWING FIGURES

DETAILED DESCRIPTION OF THE PREFERRED EMBODIMENT OF THE INVENTION

Figure 1:
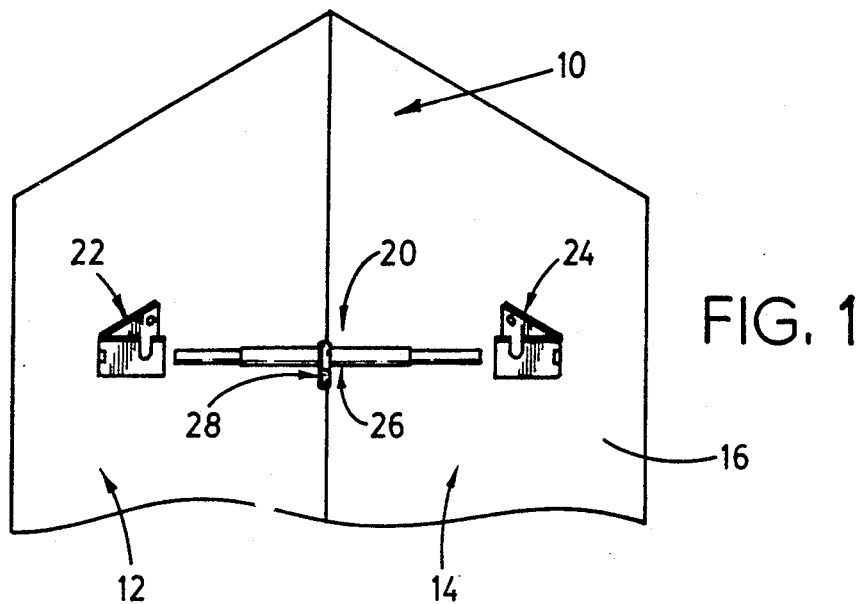
FIG. 1 is a perspective view of room corner formed by intersecting walls and having a wall hanging support assembly of the present invention mounted therein.

Shown in FIG. 1 is a room corner 10 formed by intersecting room walls 12 and 14. This corner is generally a right angle, and the walls have planar faces, such as face 16 on wall 14, that extend upwardly in a vertical plane from a floor to a ceiling of the room.

As mentioned above, it is often desirable to hang a picture, or some other object, in the corner of the room, and the present invention is embodied in a wall hanging support assembly 20 which is attached to the confronting walls 12 and 14 and which extends between such walls 12 and 14 in a vertically spaced relation to the floor of the room. As mentioned above, the wall hanging support assembly 20 permits a wall hanging, such as a picture, to be adjusted vertically and horizontally after the assembly is in place on the walls 12 and 14 whereby the wall hanging can be located in the most desirable position without undue difficulty or without leaving extra marks on the walls.

By way of orientation, the overall wall hanging support assembly includes two mounting bracket elements 22 and 24 that are affixed to the walls 12 and 14 respectively by fasteners, such as nails or the like commonly used in hanging items on walls, and a wall hanging support unit 26 extending between the brackets 22 and 24. The assembly 20 also includes two vertical extension units 30 (best shown in FIG. 5) to adjust the location of the wall hanging support unit 26 vertically with respect to the floor after the brackets 22 and 24 have been mounted on the walls 12 and 14. A wall hanging hook element 28 is slidably and dependently attached to the wall hanging support unit 26 and the wall hanging, such as a picture, or the like, is attached to the hook element 28 via suitable wires, or the like as are generally used in the wall hanging art.

Figure 2:
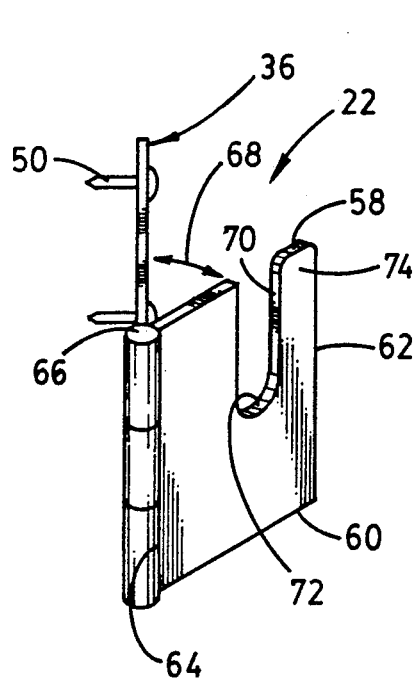
FIG. 2 is a perspective view of a mounting bracket element of the wall hanging support assembly.
Figure 3:
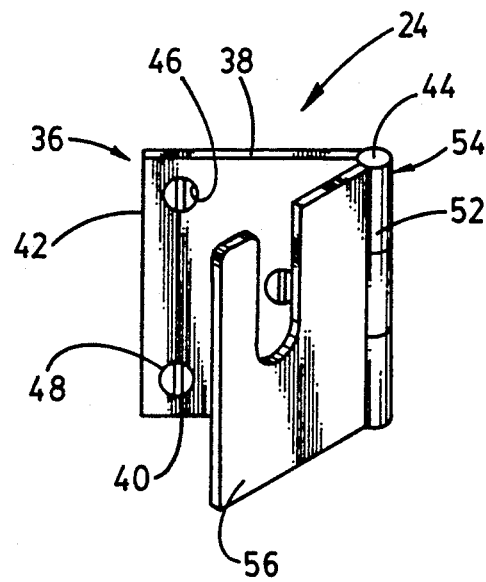
FIG. 3 is a perspective view of a mounting bracket element of the wall hanging support assembly.

The wall supported mounting brackets 22 and 24 are best shown in FIGS. 2 and 3 as each including a planar base plate 36 that is rectangular in peripheral shape to include a top edge 38, a bottom edge 40 and two side edges 42 and 44 that connect the top edge to the bottom edge. Two fastener receiving holes 46 and 48 are defined in vertically spaced relation to each other through the base plate to receive and accommodate fasteners, such as nail 50, that fixedly attaches the bracket to the wall. A hinge element 52 has a joint element 54 thereof attached to the base plate edge 44.

Each of the brackets also includes a front plate element 56 that is rectangular in peripheral shape to have a top edge 58 and a bottom edge 60 that are connected together by side edges 62 and 64. A pintle element 66 of the hinge element 52 is attached to the front plate side edge 64 to be hingeably received in the joint element of the hinge so the front plate is supported on the base plate to have the top edges 38 and 58 in coplanar relation to each other and so the face plate 56 can move toward and away from the base plate as indicated in FIG. 2 by the double-headed arrow 68. Such movement permits adjustment of the brackets 22 and 24 so that the most suitable relative orientation thereof can be effected.

The front plate 56 has an elongated slot 70 defined therein to extend from the top edge 58 thereof toward the bottom edge 60. The slot is blind ended at 72 for a purpose that will be apparent from the ensuing discussion, and can include two entranceway defining arcuate shoulders, such as shoulder 74. The entranceway will facilitate attachment of the wall hanging support unit 26 to the brackets 22 and 24.

Figure 4:
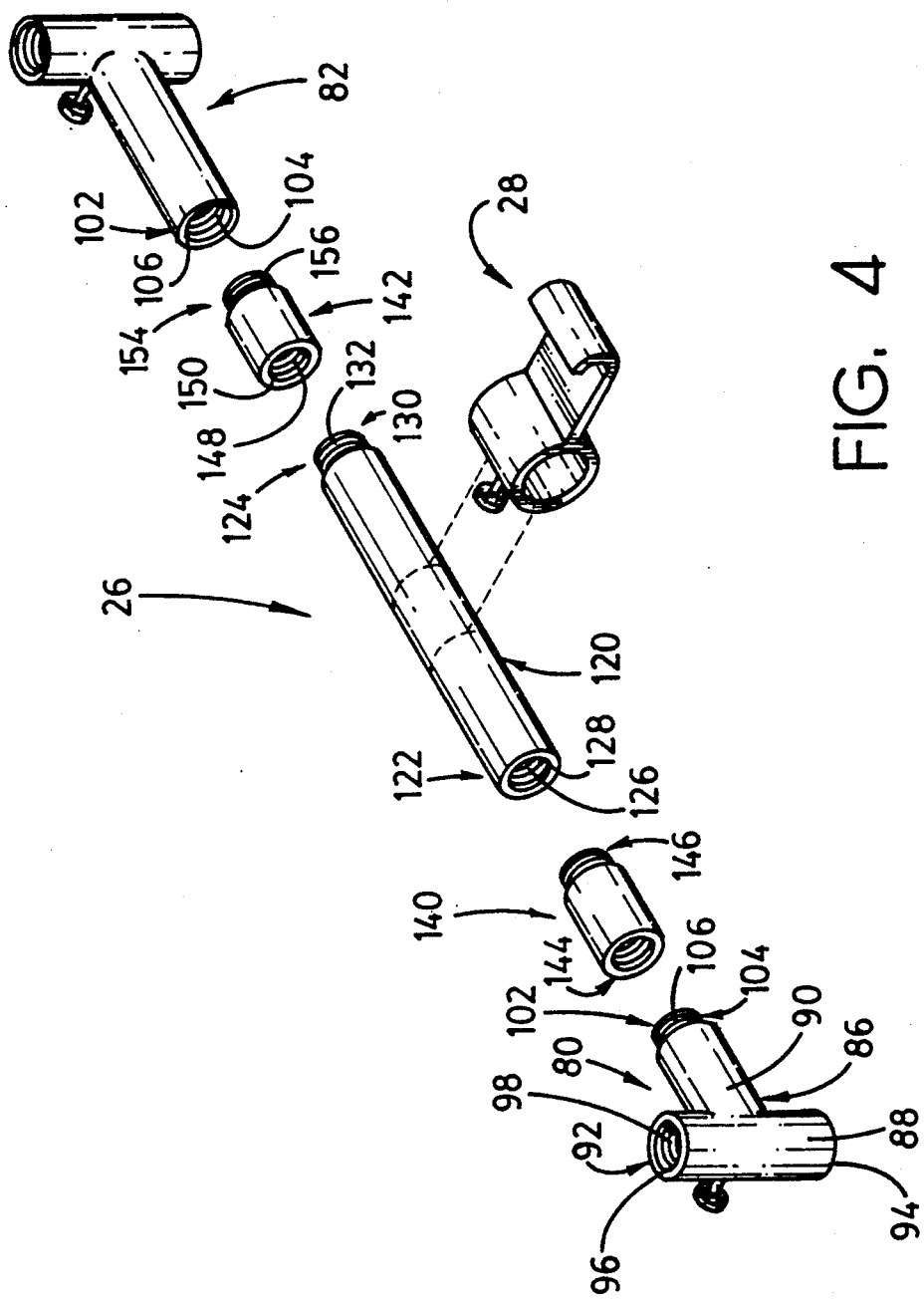
FIG. 4 is an exploded perspective view of a wall hanging support unit of the assembly of the present invention.

The wall hanging support unit 26 is best shown in FIG. 4 as including two mounting bracket attaching elements 80 and 82 which releasably couple the unit 26 to the mounting brackets 22 and 24 by via the slots 72.

Figure 7:
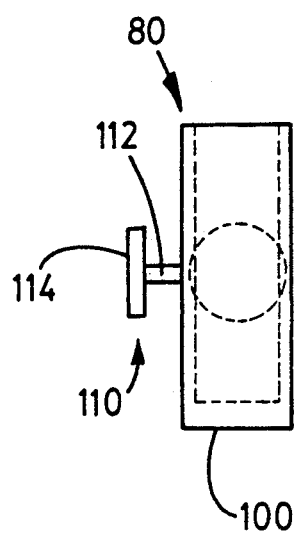
FIG. 7 is a side elevational view of a mounting bracket attaching element.

The attaching elements 80 and 82 are mirror images of each other. The attaching element 80 is shown in FIGS. 4 and 7 and includes a T-shaped body 86 having a cross piece 88 and a central body section 90 that are oriented with respect to each other to form a T-shape with the central body section extending horizontally in the set up configuration shown in FIG. 1 and the cross piece extending vertically in such set up configuration. The cross piece is a hollow tube in shape and has a first end 92 and a second end 94 with the central body section 90 being attached to the cross piece intermediate to those two ends 92 and 94. The first end 92 has a blind ended bore 96 defined therein to extend toward the second end 94, and threads 98 are defined on an inner surface of the cross piece adjacent to the blind ended bore. For the sake of convenience, the first end 92 will be referred to as a female end, and the threads 98 will be referred to as female threads. However, no limitation is intended by such nomenclature, as it is strictly for the sake of convenience. Other such nomenclature will also be used for the same purpose. The second end 94 is closed by an end cover 100.

The element 82 is a mirror image of the just-discussed element 80 in that the element 82 is identical to the element 80 with the exception of the end 102' of element 82 being a female end rather than a male end as shown for element 80. Thus the end 102' includes a blind ended bore 104' that has an internal screw thread 106' defined on the inner surface of the element adjacent to the blind ended bore.

The central body section 90 is cylindrical and has a male end 102 on the end thereof that is remote from the cross piece. The male end 102 includes a projection 104 on which external thread 106 is defined.

A T-shaped slot engaging element 110 is affixed to the cross piece 88 at a position that is essentially co-level with the longitudinal centerline of the central body section 90. The slot engaging element 110 includes a central portion 112 that is sized to slide into and out of the slots 70 of the brackets 22 and 24. A top flange 114 is affixed to the central portion 112, and is sized to engage the sides of the bracket front plates adjacent to the slots to couple the elements 110 to the brackets.

The wall hanging support unit 26 further includes a central tubular section 120 that extends horizontally in the set up configuration shown in FIG. 1. The tubular section 120 includes a first end 122 and a second end 124, with the first end 122 being referred to as a female end and the second end 124 being referred to as a male end. The first end 122 includes a blind ended bore 126 and includes a screw thread 128 defined on the inner surface of the section adjacent to the blind ended bore, and the second end 124 includes a projection 130 extending outwardly therebeyond along the longitudinal centerline thereof and which has an external screw thread 132 defined thereon.

The support unit 26 further includes two identical extension elements 140 and 142. The extension elements 140 and 142 are tubular in shape and each has a first end, such as end 144 of element 140 and a second end, such as end 146 of the element 140. The first ends have a blind ended bore, such as bore 148 of element 142 defined therein and an internal screw thread 150 is defined on the element adjacent to such blind ended bore. The second ends include a projection, such as projection 154 of the element 142, which extends along the longitudinal centerline of the element, and has an external thread, such as thread 156, defined thereon.

As indicated in FIG. 4, all of the internal and external screw threads of the assembly are sized for co-operable association to couple the various elements together into the set up configuration shown in FIG. 1.

Figure 6:
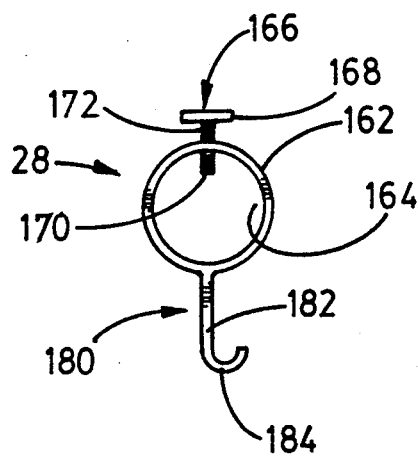
FIG. 6 is a side elevational view of a hook element.

The wall hanging hook element 28 is best shown in FIGS. 4 and 6 to include a tubular body 162 having a bore 164 defined therethrough and through which the tubular section 120 is received in sliding accommodation. A fastener 166 is threadably mounted on the body 162 to move into and out of the bore 164 upon turning a wing nut 168 so that a forward end 170 of a threaded body 172 will jam against the tubular section 120 to frictionally attach the hook element 28 to the section 120. A threaded hole is defined through the body 162 to accommodate the threaded body 172.

A J-shaped hook element 180 has a body 182 attached at one end to the body 162 and has an arcuate element 184 located on another end. The wall hanging wire or other such support element is engaged with the J-shaped hook element to pendently support that wall hanging from the walls via the apparatus 20.

Figure 5:
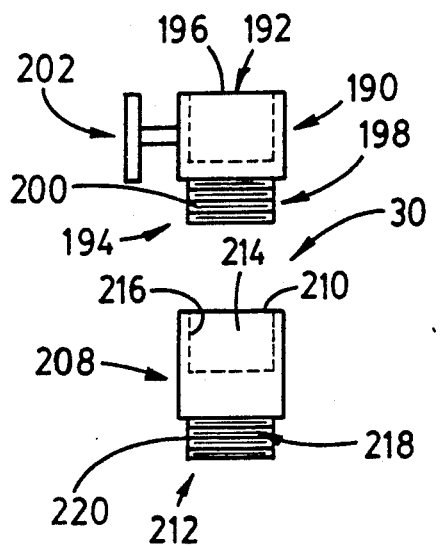
FIG. 5 is a side elevational view of a vertical extension assembly of the wall hanging support assembly.

The assembly further includes a plurality of vertical extension units, such as vertical extension unit 30 shown in FIG. 5. These extension units permit the central tube 120 to be moved vertically with respect to the brackets 22 and 24 to permit vertical adjustment of the wall hanging after the assembly has been mounted on the wall. This will permit adjustments to be made should the wall hanging not look exactly as envisioned before the brackets are affixed without leaving a mark on the wall as would occur if the brackets were removed after mounting.

Each vertical extension unit includes a tubular body 190 that has a first end 192 and a second end 194, with the first end 192 being closed by an end cap 196, and the second end having a projection 198 thereon with an external screw thread 200 defined thereon. A T-shaped wall bracket engaging element 202 is mounted on the body 190 intermediate to the two ends thereof, and is similar to the element 110 discussed above. This element 202 slidably engages the bracket slots 70 and the projection extends vertically downward in the set up configuration.

Each vertical extension unit further includes a second tubular body 208 having a first end 210 and a second end 212, with the first end having a blind ended bore 214 defined therein and an internal screw thread 216 defined on the inner surface of the body 208 adjacent to that blind ended bore. The second end 212 includes a projection 218 on which an external screw thread 220 is defined.

The screw thread 218 is sized for co-operable association with the screw thread 216 or with the screw thread 98 so that several extension elements can be strung together from the first tubular body 190 and the elements 80 and 82 can be attached to the last of these extension elements. The central section of the assembly is attached to the elements 80 and 82 as above discussed. However, with the use of the vertical extension elements 30, the central section 26 is displaced downwardly from the brackets by a distance corresponding to the lengths of the tubular bodies 190 and 208 used.

Referring to FIGS. 8-12, a second form of the wall hanging support assembly of the present invention is shown.

Figure 8:
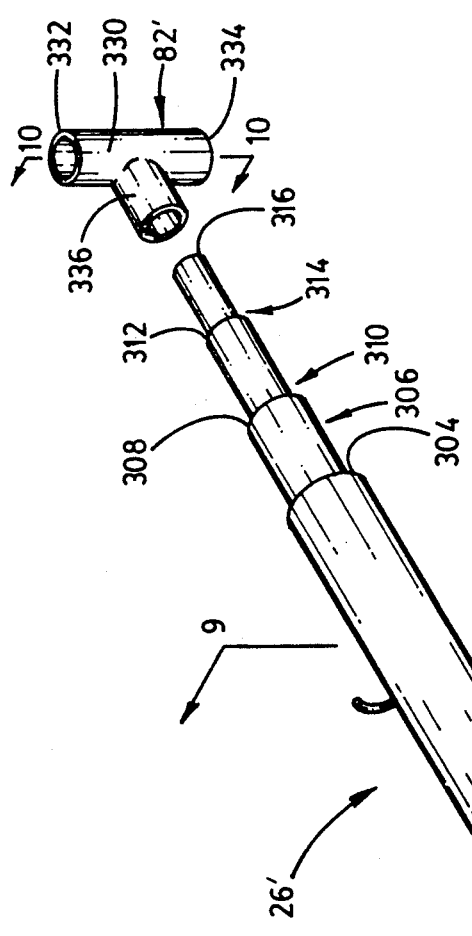
FIG. 8 is a perspective view of a second form of the wall hanging support unit of the present invention.
Figure 9:
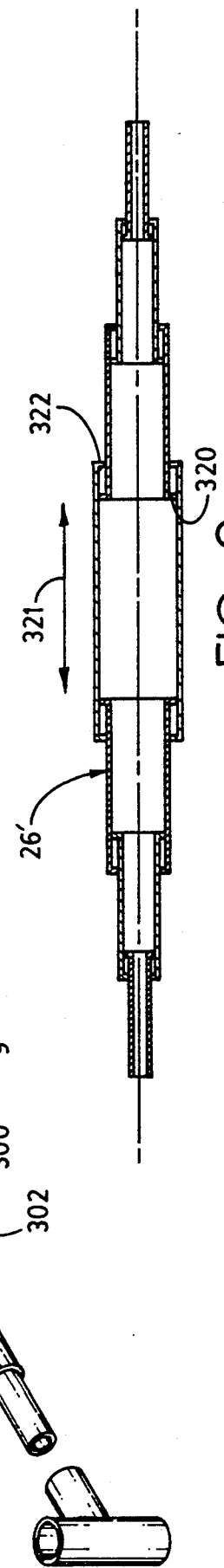
FIG. 9 is an elevational view taken along line 9—9 of FIG. 8.

As best shown in FIGS. 8 and 9, the second form of the assembly includes a telescoping support unit 26' which is adjustable to accommodate a wide variety of wall spacings. The unit 26' includes a central tubular section 300 having ends 302 and 304 and a bore defined longitudinally therethrough. Two identical tubular first extensions 306 are slidably received in the central section via the ends of that central section. The first sections include a longitudinal bore defined therethrough, and include ends, such as end 308 which is spaced from the central section, and an end that is located in that central section. Two identical tubular second sections 310 are slidably received in the first sections through the ends 308, and include a longitudinal bore and ends, such as end 312, with one of the ends being received inside of an associated second section. Two identical end sectons 314 are also tubular and have a longitudinal bore defined therethrough with one end 316 located remotely from the central section and one end received inside the second section. The sections are all sized to slide into and out of each other so the overall unit can be telescoped in the directions indicated by the double-headed arrow 321 to adjust the length thereof as measured between ends 316 of the end sections. Each section includes a flared end 320 and a shoulder 322 with the flared ends abutting a shoulder to prevent one section from being accidentally pulled out of its adjacent section.

Figure 10:
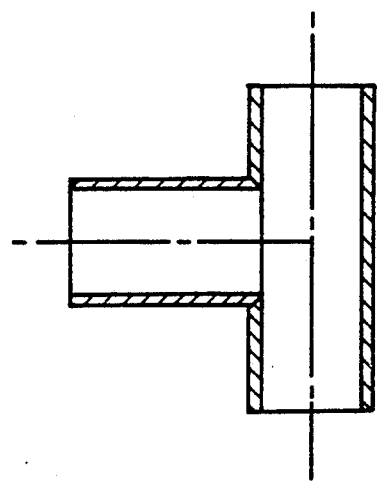
FIG. 10 is an elevational view taken along line 10—10 of FIG. 9.

The assembly 26' also includes two identical attaching elements 82', which are best shown in FIGS. 8 and 10. Each attaching element is T-shaped, and includes a tubular body 330 having ends 332 and 334, which can be internally threaded as discussed above with regard to elements 82. A tubular leg 336 is attached at one end to the body 330 and receives an end section 314 in another end thereof. The attaching elements 82' are used in the manner discussed above for elements 82.

Figure 11:
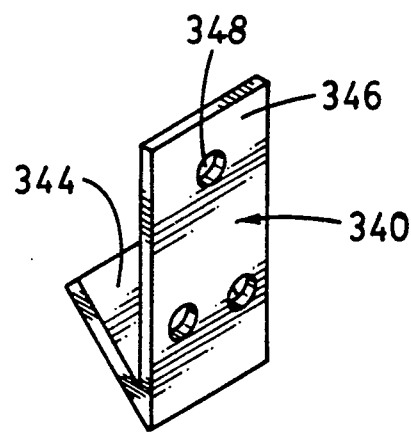
FIG. 11 is a bendable bracket in the un-bent configuration.
Figure 12:
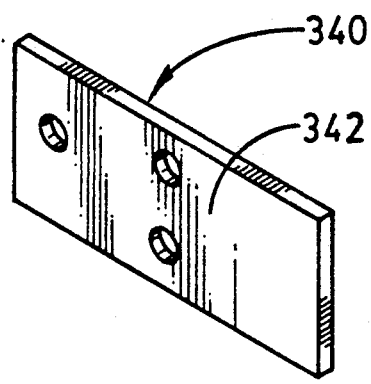
FIG. 12 is the bendable bracket in the bent condition.

The assembly 26' further includes bendable mounting brackets 340, shown in FIGS. 11 and 12. The brackets are monolithic and include a creaseline 342 which is bent to define an L-shape for the bracket with a short leg 344 and a long leg 346 having fastener-receiving holes 348 defined therethrough. The brackets 340 are bent and attached to a wall, and the elements 82' are attached thereto to mount the assembly 26' to a wall at a corner as above discussed.

It is understood that while certain forms of the present invention have been illustrated and described herein, it is not to be limited to the specific forms or arrangements of parts described and shown.

I claim:

1. A wall hanging support assembly comprising:
(A) two mounting bracket elements, each including
   (1) a base plate having two fastener receiving holes through which fasteners pass to mount said base to a wall,
   (2) a hinge connected to said base,
   (3) a front plate element attached to said base plate by said hinge to move toward and away from said base plate, said front plate including an elongate blind-ended slot defined therein to extend from one edge of said front plate, said slot having a width dimension, and
   (4) fastener elements attaching said base plate to the wall;
(B) a wall hanging support unit which is releasably attached to said mounting brackets and which includes
   (1) two mounting bracket attaching elements, each being releasably connected to one of said wall mounting brackets and each including
      (a) a T-shaped body having a cross piece that is cylindrical in shape and has a blind ended bore defined in one end thereof with a screw thread defined in an internal surface of said cross piece adjacent to said blind ended bore, and a central body section attached to said cross piece intermediate to said ends, and
      (b) a T-shaped slot engaging element on said body intermediate to said cross piece ends and having a central portion that is sized to slide into and out of one of said bracket slots and a flange on said central portion that is larger than said width dimension, (c) a first one of said mounting bracket attaching elements including a blind ended bore defined in one end of said central body, and (d) a second one of said mounting bracket attaching elements including a projection having an external screw thread defined thereon, (2) a central tubular section having a female end with a blind ended bore on one end thereof and a male end with a projection on another end thereof, with a screw thread defined internally of said female and in said blind ended bore and a screw thread defined externally on said male end projection, and (3) two extension tubular sections, each extension tubular section including (a) a female end on one end thereof and a male end on another end thereof, (b) said female end including a blind ended bore having a screw thread defined on the surface of said extension tubular section adjacent to said blind ended bore and threadably attaching said extension tubular section female end to said central tubular section male end, and (c) said male end having a projection with a screw thread defined externally thereof and threadably attaching said extension tubular section male end to said central tubular section female end; and (C) a wall hanging hook element which includes (a) a tubular body having a bore defined therethrough which slidably receives said central tubular section therethrough, (b) a fastener threadably mounted on said body to extend into said hook element bore, and (c) a J-shaped hook attached to said hook element body.

2. The wall hanging support means defined in claim 1 further including two vertical extension units each including (a) a first tubular body having first and second ends, (b) said first and including a projection having a screw thread on an exterior surface thereof, (c) a T-shaped wall bracket attaching element mounted on said first tubular body intermediate to said first and second ends, and (d) a second tubular body having a male end and a female end, with a male projection being located on said second tubular body male end and having an external screw thread thereon, and a blind ended bore being defined in said second tubular body female end and having a screw thread defined on an inner surface of said second tubular body female end adjacent to said blind ended bore and threadably engaged with said first tubular body first end screw thread.

3. A wall hanging support assembly comprising:

(A) two monolithic bendable mounting bracket elements, each including (1) a long leg having fastener receiving holes through which fasteners pass to mount said base to a wall;

(2) a foldline extending across said mounting bracket element adjacent to said fastener receiving holes;

(3) a short leg attached to said long leg by said foldline to move toward and away from said long leg, and (4) fastener elements each being received through each of said fastener receiving holes and attaching each bracket element to the wall;

(B) a wall hanging support unit which is releasably attached to said mounting brackets and which includes (1) two T-shaped mounting bracket attaching elements, each being releasably connected to one of said bendable mounting brackets and each including a tubular body that is cylindrical in shape, has a bore defined therethrough, and includes ends, with each end having a screw thread defined internally thereof, (2) a tubular leg section attached at one end thereof to said tubular body intermediate to said tubular body ends and having longitudinal bore defined therethrough between said ends, and (3) two extension tubular sections, each extension tubular section being slidably received in said tubular section and including (a) a flared end on one end thereof and a shoulder on another end thereof;

(C) a central tubular section having two ends and one end of said two extension tubular sections attached thereto at each of said two ends thereof; and (D) a wall hanging hook element which includes (a) a tubular body having a bore defined therethrough through which said central tubular section is slidably received, (b) a fastener threadably mounted on said body to extend into said hook element bore, and (c) a J-shaped hook attached to said hook element body.

4. The wall hanging support assembly defined in claim 3 wherein said central tubular section includes a plurality of extension tubular sections between said two ends thereof.

* * * * *